BILLINGS & AMBROSE
Attaching Hubs to Axles.
No. 7,450.
Patented June 25, 1850.
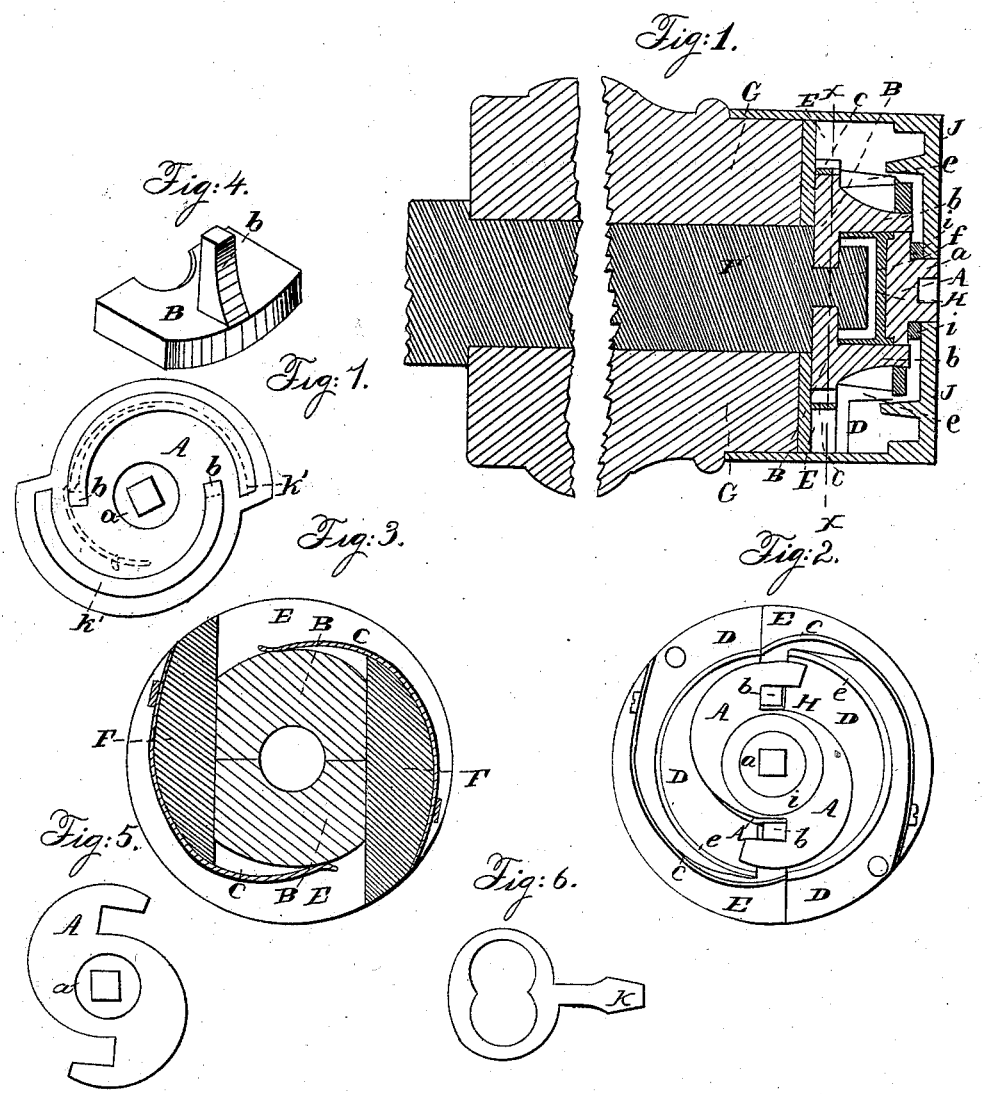

UNITED STATES PATENT OFFICE.

A. M. BILLINGS AND THOS. A. AMBROSE, OF CLAREMONT, NEW HAMPSHIRE.

CONNECTING AND DISCONNECTING HUBS AND AXLES.

Specification of Letters Patent No. 7,450, dated June 25, 1850.

*To all whom it may concern:*

Be it known that we, A. M. BILLINGS and THOMAS A. AMBROSE, of Claremont, in the county of Sullivan and State of New Hampshire, have invented a new and Improved Manner of Fastening Wheel-Hubs to Axles; and we do hereby declare the following to be a full and exact description thereof, reference being had to the accompanying drawings, making a part of this specification.

Figure 1, is a longitudinal section through the center of a portion of a hub (G,) and axle journal F, placed therein, and the fastening apparatus secured to the hub; Fig. 2, a plan of the fastening apparatus; Fig. 3, a section in the line $x$, $x$, of Fig. 1; Fig. 4, a perspective view of a portion of the apparatus detached; Fig. 5, a plan of a detached portion of the apparatus; and Fig. 6, a plan of the key for operating the fastening apparatus.

Similar letters indicate like parts in all the figures.

E, is a metallic disk.

F, F, are studs rising from the disk E, and surmounted by the plate D.

H, is a cup projecting outward from the center of the plate D, and $e$, $e$, are segmental flanches projecting from D, being concentric with H, and a short distance from its periphery.

B, B, are sliding plates which are made to fit accurately in the space between the disk E, the plate D, and the studs F, F.

$c$, $c$, are springs which are secured to the curved outer surfaces of the studs F, F, with their outer extremities bearing against the outer curved ends of the plates B, B, and thereby forcing the inner ends of B, B, closely together. Semi-circular grooves are formed in the inner ends of the sliding plates B, B, which are brought opposite each other when the ends of the said plates are brought together.

The disk E, of the fastening apparatus is secured to the outer end of a hub G; and a protecting cap J, is placed over it, as shown in Fig. 1.

The journal F', of the axle to be operated upon by our fastening apparatus, has a button $f$, connected to its outer extremity by a neck, as represented in Fig. 1. When the journal F', is placed within the hub, the sliding plates are moved back so as to admit the button $f$, within the cup H; the springs $c$, $c$, are then permitted to act, which force the sliding plates inward and cause the semi-circular grooves in their inner ends to embrace the neck that connects the button $f$, with the journal of the axle, and thereby securely fasten the axle journal within the hub. The sliding plates B, B, are operated when it is desired to detach a wheel from its axle journal, and the plates are prevented from being detached from their hold upon the axle journal by any jar or shock upon the wheel, in the following described manner. Legs $b$, $b$, project from the sliding plates B, B, which are operated upon by the double scroll shaped cam A, the shape of which is shown in Figs. 1 and 2. The cam A, has a circular central projection on its inner side which fits into a cavity on the outer side of the cup H, and has a stem projecting from its outer side that passes through the center of the cap J, which stem has a square recess formed in it for the reception of the key $k$. By turning the cam A, its surfaces will bear against the legs $b$, $b$, and thereby force outwards the sliding plates B, B, so as to detach them from their hold upon the axle journal. Recesses are formed between the outer and inner extremities of the two faces of the cam, which receive the ends of the legs $b$, $b$, of the sliding plates, when they (the sliding plates) are in a position to act upon the axle journal, as shown in Fig. 2, and thereby securely confine the plates when in that position, and prevent their being moved out of place by any jar or shock upon the wheel. A packing ring $i$, of leather, or other suitable elastic material, is placed around the stem $a$, of the cam A, within the cap J, which bears against the under side of the cap and keeps the cam in place, and also prevents the entrance of dust within the cap.

The disk E, of the fastening apparatus we shall sometimes cast in one piece with the box placed within the hub.

The periphery of the double scroll shaped cam A, may be entirely inclosed, as shown in Fig. 7, so as to form double scroll shaped slots K', $k'$, for the legs $b$, $b$, which rise from the sliding plates B, B, to work in; and thereby insure, by a positive action, the proper inward movement (as well as retention) of the said sliding plates. The springs $c$, $c$, may be dispensed with when this form of cam is employed, by combining a spring therewith of the form shown by the red lines in Fig. 7, to act upon one of the legs $b$, and prevent the same from turning or being jarred out of place.

What we claim as our invention and desire to secure by Letters Patent, is—

The method herein described of securely fastening the hub of a wheel to its axle, or easily detaching the same therefrom; to wit, by means of the two sliding plates B, B, combined with the double scroll shaped cam A, in such a manner that by turning the said cam in one direction, the sliding plates (B, B,) will fasten the axle journal within the hub so securely that it cannot be unfastened by any jar or shock upon the wheel; and by turning the said cam in an opposite direction, the sliding plates (B, B,) will be detached from their hold upon the axle journal and permit the wheel to be detached therefrom.

The above specification of our improved manner of fastening wheel hubs to axles, signed and witnessed this 6th day of March 1850.

A. M. BILLINGS.
T. A. AMBROSE.

Witnesses.
EDWIN AINSWORTH,
JOHN BLAKE.